United States Patent [19]

Newman et al.

[11] Patent Number: 4,978,032
[45] Date of Patent: Dec. 18, 1990

[54] METHOD AND APPARATUS FOR DISPENSING CUPS AND VENDING MACHINES FOR BEVERAGES

[75] Inventors: Alec T. Newman, Warmington; David Rhodes, Banbury, both of United Kingdom

[73] Assignee: General Foods Limited, Banbury, United Kingdom

[21] Appl. No.: 344,323

[22] Filed: Apr. 25, 1989

[30] Foreign Application Priority Data

Apr. 29, 1988 [GB] United Kingdom ............... 8810208

[51] Int. Cl.⁵ .............................................. B65H 3/32
[52] U.S. Cl. ..................................... 221/119; 221/96; 221/113; 221/121
[58] Field of Search ............... 221/96, 113, 119, 121, 221/122, 221, 223, 279, 278; 406/88

[56] References Cited

U.S. PATENT DOCUMENTS

| 2,248,479 | 7/1941 | Miller | 221/223 |
| 3,610,469 | 10/1971 | Kuckens | 221/278 |
| 4,807,780 | 2/1989 | Parsons et al. | 221/113 |

FOREIGN PATENT DOCUMENTS 1604306 12/1981 United Kingdom ............... 221/96

Primary Examiner—Andres Kashnikow
Assistant Examiner—W. Todd Waffner
Attorney, Agent, or Firm—Linn I. Grim

[57] ABSTRACT

An apparatus is described for dispensing the bottom cup from a selected stack of cups utilizing a rotatable carriage for supporting a plurality of stacks of cups arranged along the rotary path of the carriage. As the carriage rotates a stack is selected from which a cup is to be dispensed a sensor determines when the selected stack reaches a predetermined position along the rotary path of the stacks. There are separators for separating the bottom cup from the respective stack and a solenoid operated ramp for movement into the rotary path of the separating means to separate the bottom cup from the selected stack. The solenoid operated ramp is operated by a signal from the sensing means.

9 Claims, 8 Drawing Sheets

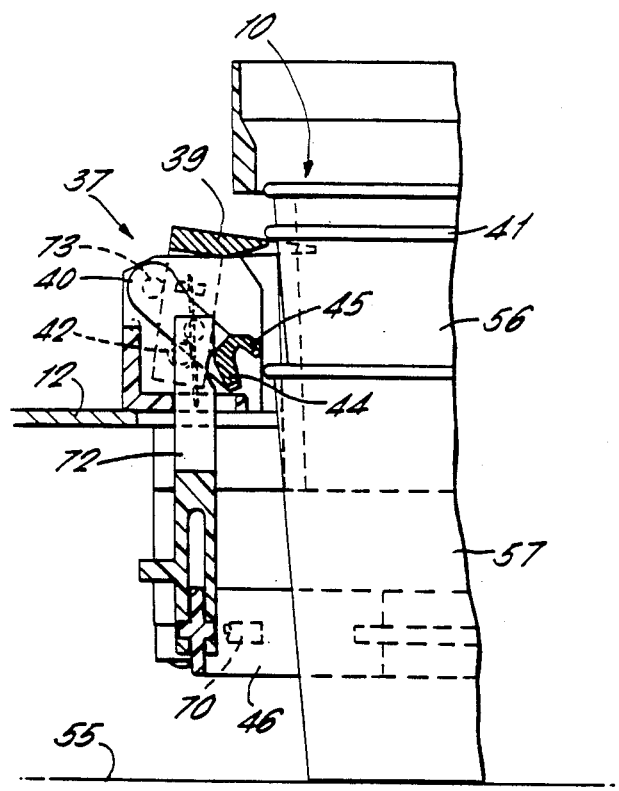

METHOD AND APPARATUS FOR DISPENSING CUPS AND VENDING MACHINES FOR BEVERAGES

This invention relates to a method and apparatus for dispensing the bottom cup from a selected stack of cups, and also to vending machines for beverages.

Vending machines are known for dispensing a variety of different beverages selected by the user. For this purpose cups containing different basic ingredients are arranged in separate stacks so that when a particular beverage is selected by the user, the bottom cup in the respective stack is caused to be stripped from the stack and supplied to a point of access to the user. Prior to the user receiving the cup, one or more further ingredients may be added as required.

Conveniently the stacks of cups are disposed vertically in a circle on a carriage in the manner of a carousel. On selection of a particular stack, the carriage is rotated until the selected stack reaches a dispensing station. The carriage is then stopped and the required cup is stripped from the stack. Because the cup must be dropped in alignment with means for moving the cup from its drop position to the access point for the user, it is necessary to stop the carriage accurately at a precise, predetermined position of rotation. For this purpose, it is known to employ a Geneva mechanism which indexes the carriage through each stacking position, stopping and starting the drive motor, until the selected stack reaches the dispensing station. Such an indexing mechanism is effective but has two major disadvantages. It results in a slow vend and even more importantly considerable stress on the parts of the carriage, which may have eight or ten stacks of ingredient containing cups and weigh up to 30 lbs when fully loaded.

It is also desirable to separate the required cup from the remainder of its stack without creating sufficient vacuum to cause the beverage ingredient to spray out of the cup.

According to the invention there is provided a method of dispensing the bottom cup from a selected stack of cups comprising supporting a plurality of stacks of cups on a rotatable carriage, the stacks being arranged along the rotary path of the carriage, selecting the stack from which a cup is to be dispensed, rotating the carriage, sensing when the selected stack reaches a predetermined position along the rotary path of the stacks, and separating the bottom cup from the selected stack whilst the carriage continues to rotate.

Preferably, during each operating cycle, the carriage is rotated through one revolution.

It is also preferred that the bottom cup is separated from the selected stack in two stages, the bottom cup being partially separated from the penultimate cup of the stack, moved laterally around a further portion of the rotary path as the carriage continues to rotate, and subsequently separated fully from the penultimate cup. Said movement of the bottom cup along a further portion of the rotary path is preferably effected by supporting the bottom cup on a surface and allowing the stack of cups above the bottom cup to move the bottom cup over said surface.

The cups of at least some of the stacks are preferably pre-loaded with a beverage ingredient.

Preferably the bottom cup is stripped from the selected stack.

The separated bottom cup is preferably moved along a predetermined path to an access point for a recipient and a beverage ingredient or a further beverage ingredient introduced into the cup at at least one position along that path. Conveniently the separated bottom cup is blown along said predetermined path.

The invention also provides apparatus for dispensing the bottom cup from a selected stack of cups comprising a rotatable carriage for supporting a plurality of stacks of cups, the stacks being arranged along the rotary path of the carriage, drive means to rotate the carriage, means for selecting the stack from which a cup is to be dispensed, means for sensing when the selected stack reaches a predetermined position along the rotary path of the stacks, and means for separating the bottom cup from the selected stack whilst the carriage is continuously rotated.

Preferably the apparatus includes separating means at the bottom of each stack for separating the bottom cup from the respective stack, and common actuator means capable of operating the separating means of the selected stack and interconnected with said sensing means. The common actuator means may be a solenoid operated ramp for movement into the rotary path of the separating means to actuate the separating means to separate the bottom cup from the selected stack, the solenoid being operated by a signal from the sensing means.

It is also preferred that the separating means comprise levers for stripping the bottom cup from the stack.

Preferably a surface is provided for supporting the separated bottom cup in a partially separated position beneath the penultimate cup of the stack whilst the carriage continues to rotate.

A passageway is preferably provided for conveying the separated bottom cup to an access point for a recipient.

Preferably means are provided at one or more points along said passageway for introducing at least one beverage ingredient into the cup. A motor driven fan may be provided for blowing the separated bottom cup along said passageway.

The invention further provides a vending machine for beverages including a cup dispensing apparatus as defined above.

By way of example, a specific embodiment in accordance with the invention will be described with reference to the accompanying drawings in which:

FIGS. 6 to 8 show the sequence of operation of the stripping means of FIG. 5 to dispense the bottom cup from the stack onto a shelf below.

This example concerns a vending machine for dispensing a variety of different beverages selected by the user. Each basic ingredient, e.g. coffee or soup, is pre-packed in cups which are stacked vertically, and there may be more than one stack containing the same basic ingredient and/or stacks of empty cups. When a beverage is required, the machine is operated by the user selecting the appropriate stack of cups to dispense the bottom cup of the stack and to add the necessary ingredients or other ingredients to produce the beverage. The machine may be coin or card operated or free vend, as desired.

Figure 1:
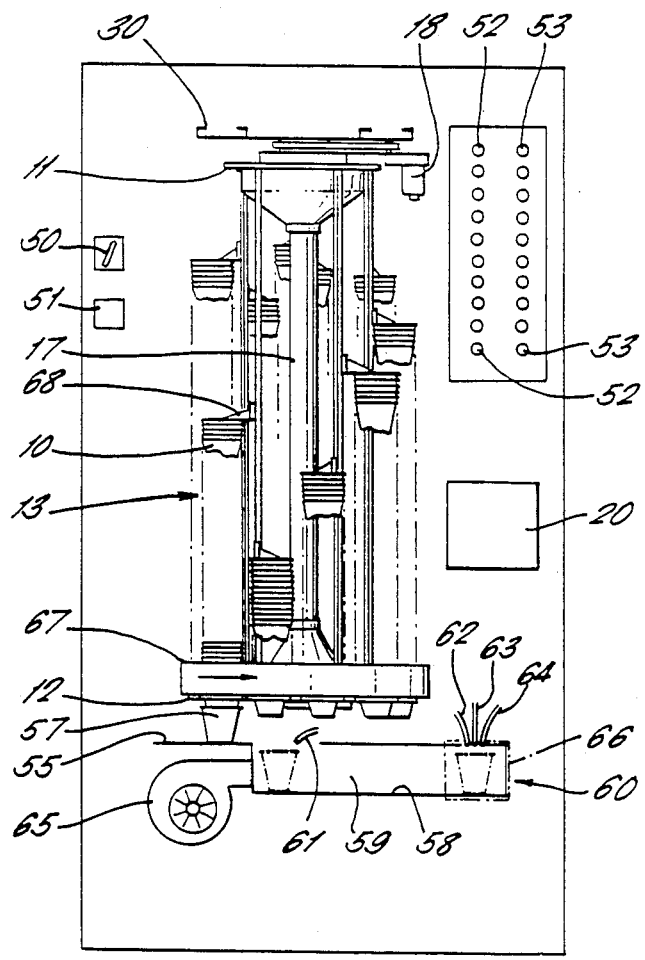
FIG. 1 is a sectional elevation, partly cut-away, of a vending machine for dispensing beverages in cups.
Figure 2:
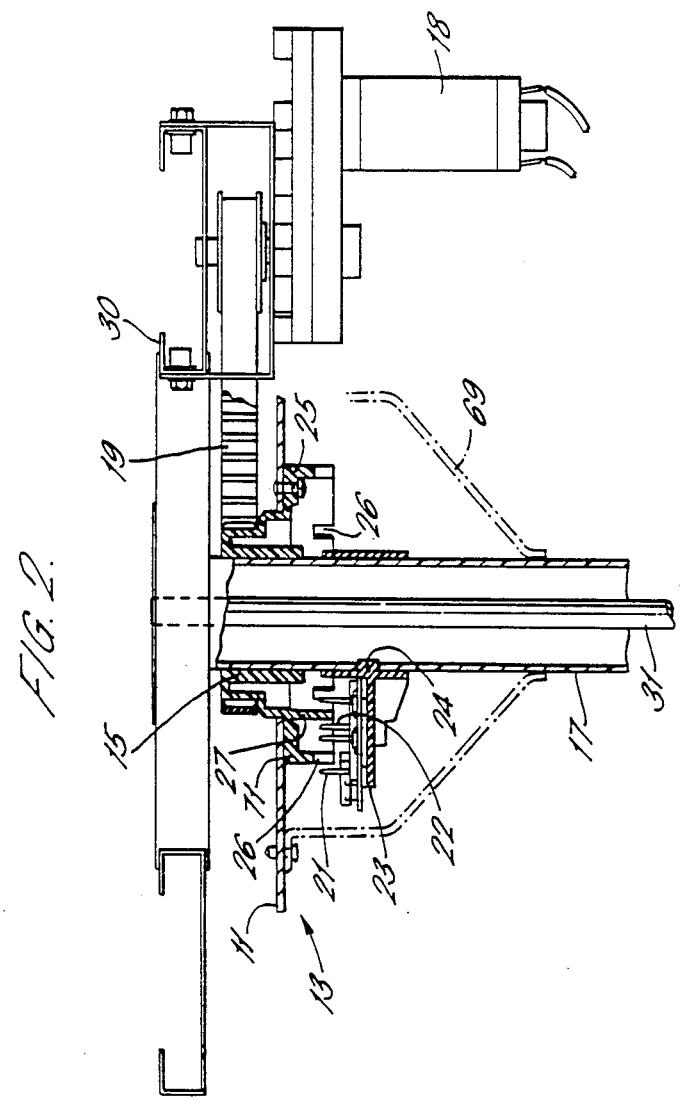
FIG. 2 is a sectional elevation, partly cut-away, of the upper part of the carriage supporting the stacks of cups to be dispensed.

Referring to the drawings, the vending machine comprises a carousel of ten stacks of cups 10 disposed along a rotary path which, in this embodiment, is a circle. The stacks of cups 10 extend between top and bottom plates 11, 12 of a carriage 13 which are interconnected by five columns 14. Bearings 15, 16 in the plates 11, 12 respectively allow the carriage to be rotated about a fixed central post 17 suspended from a frame 30. A rod 31 extending longitudinally through the post 17 is welded at its top end to the frame and at its lower end is screw threaded and carries a nut 32 which retains the carriage on the post. The drive means is an electric motor 18 mounted on the frame 30 and connected to the top plate 11 of the carriage by a belt drive 19. Control means for the motor 18 comprises a microprocessor 20 which receives input signals from two photo-electric devices 21, 22 (FIG. 2) so that the microprocessor is aware of the rotational position of the stacks of cups relative to a fixed point in its rotary path. For this purpose, the central post 17 carries a platform 23 located at a desired angular position adjacent the top plate 11 of the carriage by a peg 24 projecting into a hole in the post 17. Mounted on the platform 23 are the photo-electric devices 21, 22. Also on the underside of the top plate 11 for rotation therewith, is a disc 71 having a downwardly extending rim 25 provided with ten slots 26 equally spaced around its periphery for association with the first photo-electric device 21. The disc 71 also has a projection 27 associated with the second photo-electric device 22 and representing a "home" position in the rotary path of the carriage 13 which is intended, in this embodiment, to start and stop with the projection 27 aligned with the second photo-electric device 22. It will also be appreciated that the ten slots 26 correspond to the ten stacks of cups of the present embodiment. In other embodiments there may be other numbers of stacks. Thus, as the carriage rotates, the first photo-electric device passes a signal to the microprocessor as each slot and therefore each stack passes the first photo-electric device 21. For this reason, it is not essential that the carriage 13 stops precisely at its home position at the end of an operating cycle, since any over-run is taken into account by the microprocessor 20 during the next operating cycle. Also, the fact that the first photo-electric device 21 signals the passing of each slot and effectively counts the stacks as the carriage rotates means that the device 21 can cause the actuation of a solenoid 28, as described below, to perform a function which will initiate the stripping of the required cup 57 when the selected stack reaches an appropriate position in the rotary path of the carriage 13.

Figure 3:
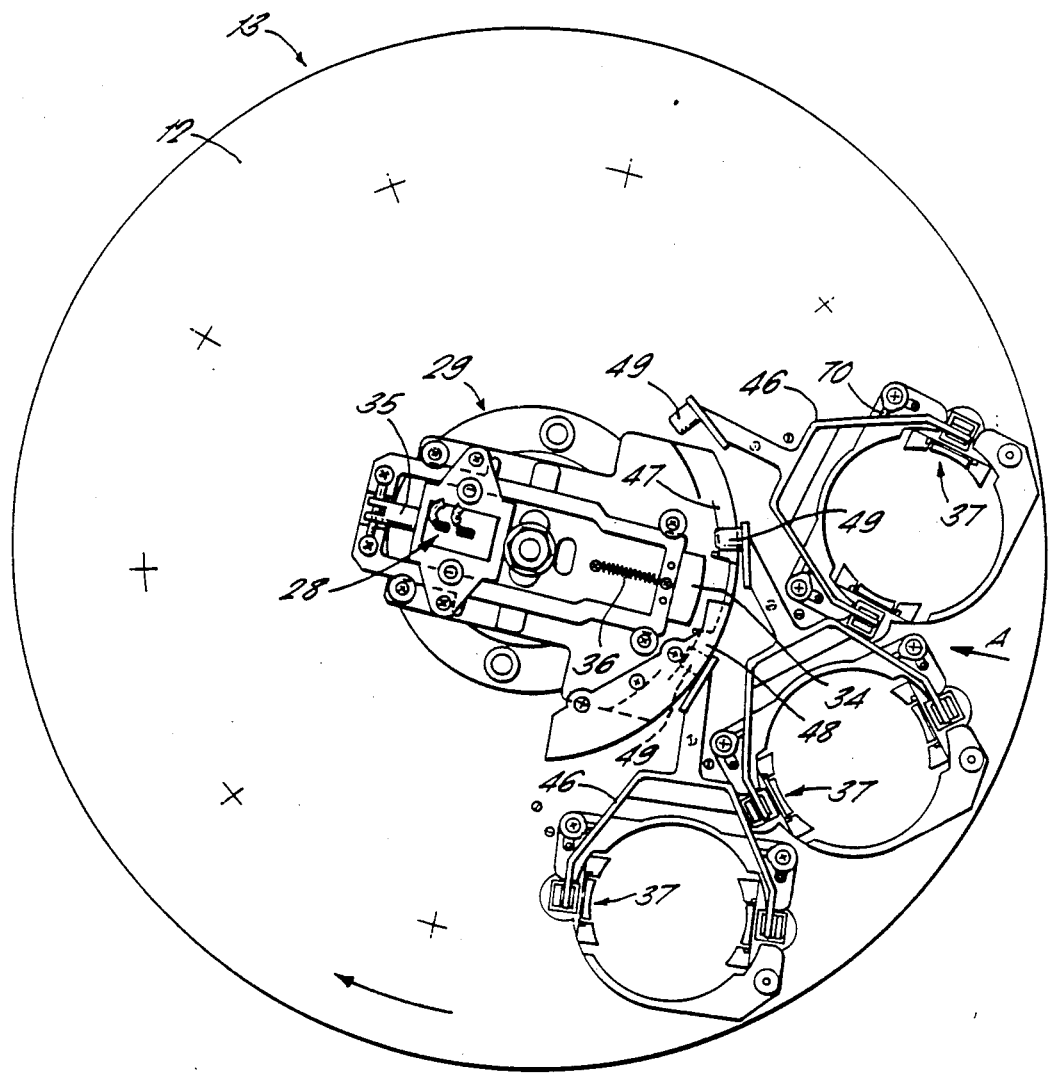
FIG. 3 is an underplan of the cup supporting carriage.
Figure 4:
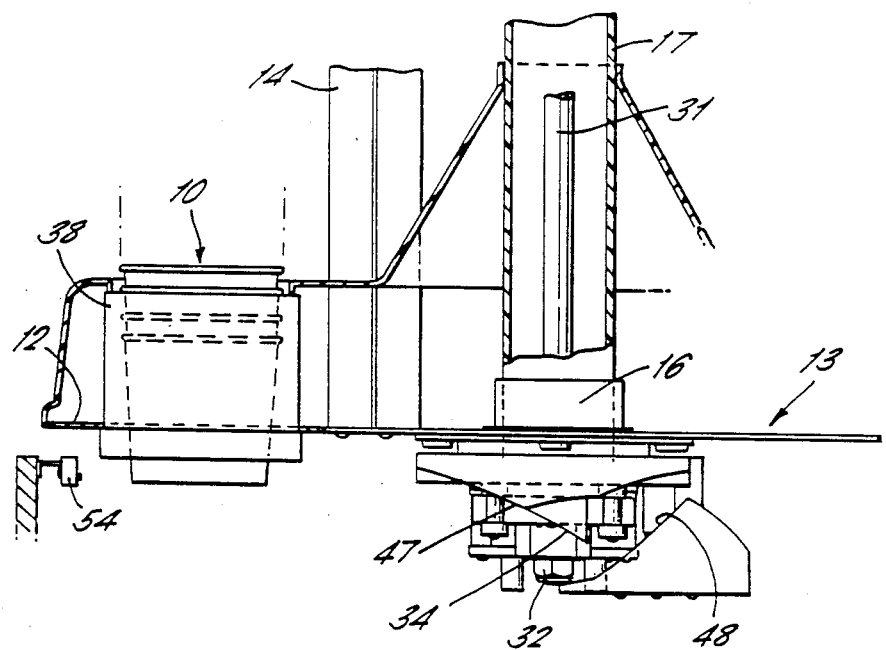
FIG. 4 is a detailed view of the central element beneath the bottom plate of the carriage as viewed in the direction of arrow A in FIG. 3.
Figure 5:
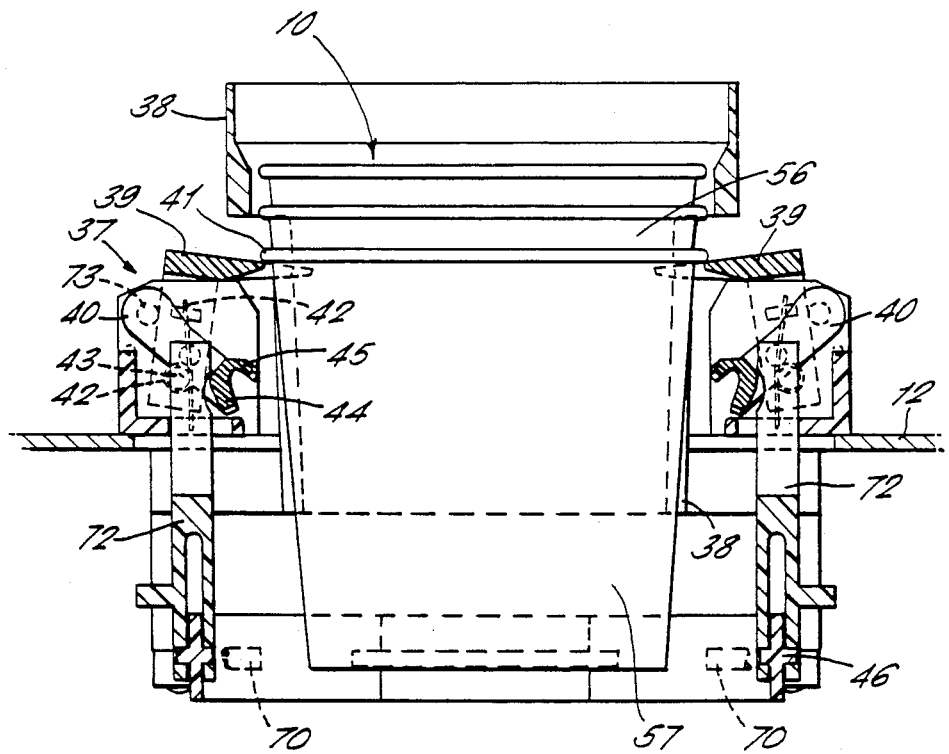
FIG. 5 is a section through the bottom end of one of the stacks of cups showing the upper levers of the stripping means beneath the rim of the bottom cup.
Figure 6:
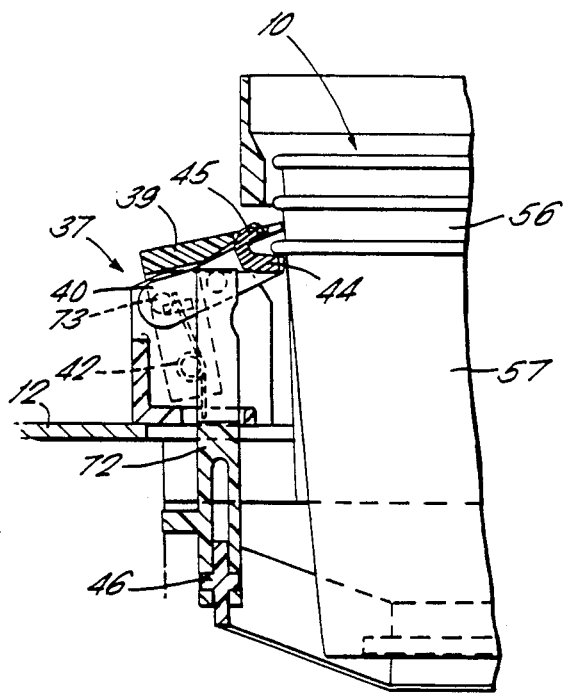
Figure 7:
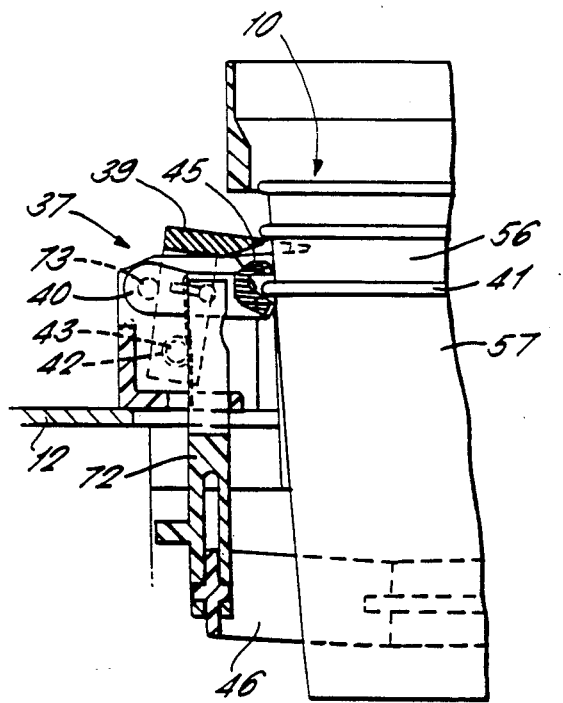

The solenoid 28 is the central element 29 beneath the bottom plate 12 of the carriage 13 and is mounted in a fixed state on the bottom end of the post 17 (FIG. 3). The rotational position of the element 29, so that it is aligned correctly relative to the position of the first photo-electric device 21 on the platform 23, is determined by diametrically opposed notches in the bottom end of the post 17. Moreover, the notches have different depths so that the element cannot be 180° out of position. For initiating the stripping of the required bottom cup 57, the solenoid 28 carries a movable ramp 34 which is moved to a radially extended position, by reciprocal movement of the armature 35 into the coil of the solenoid The ramp 34 extends at an angle which is directed downwardly in the direction of rotation of the carriage 13. The movable ramp is also disposed, when extended, between and in the same arcuate path as the two fixed ramps 47, 48 (see FIG. 4), the leading ramp 47 in the direction of rotation of the carriage 13 descending towards the upper end of the movable ramp 34 and the trailing ramp 48 rising from the lower end of the movable ramp. Return movement of the ramp 34 is effected by a spring 36. Attached to the bottom plate 12 of the carriage and surrounding the solenoid element 29 are the means 37 for separating, which in this embodiment involve stripping, the bottom cup 57 from the selected stack, a separate stripping means being provided for each stack. Each stripping means 37 (FIG. 5) comprises a short length of tube 38 mounted in a respective aperture in the bottom plate 12 of the carriage 13. Also, projecting through openings in the wall of the tube 38 are two diametrically opposed pairs of levers 39, 40. The upper lever 39 of each pair is biassed by a spring 42 to extend substantially horizontally beneath the rim 41 of the bottom cup 10 of the respective stack and has a pivot 43 to allow upward and outward pivotal movement of the lever which enables the stack to drop. The lower lever 40 of each pair has a forked inner end and is mounted for pivotal movement about pivots 73. Each lower lever 40 is also pivotally connected to a downwardly extending link 72. The bottom arm 44 of the forked end of each lower lever 40 serves to catch the stack of cups 10 after retraction of the upper levers 39 (FIG. 6). The top arm 45 of the fork acts to positively separate or strip the bottom cup 57 from the stack, the stack meanwhile being held by the upper levers 39 extending beneath the rim of the penultimate cup 56. Upward and outward pivotal movement of each upper lever 39 is effected by similar upward and outward pivotal movement of the associated lower lever 40 to contact the underside of the upper lever, whilst return movement of the upper lever 39 is effected by the respective spring 42. For each stripping means, the bottom ends of the two links 72 are interconnected for movement in both directions by a yoke 46 which is itself pivotally mounted by pivots 70 and is directed substantially inwardly of the carriage towards the central element 29 (see FIG. 3). The inner end of the yoke 46 carries a stud 49 which is at the same radial distance from the central axis of the carriage 13 as the fixed ramps 47, 48 and the movable ramp 34 when extended. During rotation of the carriage 13, the stud 49 of each stripping means makes contact with the fixed ramps 47, 48 thereby causing the respective lower levers 40 to move up and down. However, it is only when the stud makes contact with the intermediate movable ramp 34, which has previously been extended by the solenoid 28, that the lower levers 40 are pivoted upwardly a sufficient amount to engage and raise the upper levers 39 (FIG. 6) and thereby release the associated stack of cups 10. Subsequently as the stud 49 rises up the trailing ramp 48, the top arms 45 of the lower levers 40 strip the bottom cup 57 from the stack, and the other cups are retained as a stack with the rim of the cup 56 resting on the upper levers which have then been returned to their normal positions by the springs 42 (FIGS. 7 and 8).

A dust cover 67 is provided at the base of the carriage 13 to cover the stripping means 67 for each stack of cups and also the central solenoid element 29. Similarly, dust covers 68 are provided to cover the top cup of each stack, two of the covers 68 being separately mounted for sliding movement on each column 14. Each cover 68 is thereby able to move downwardly with the respective stack, as the height of the stack is reduced by the removal of cups from its lower end. A further inverted conical dust cover 69 is also provided for the platform 23 carrying the photo-electric devices 21, 22.

In this embodiment, to select the required beverage, the machine is coin-operated, but as explained above it may be card operated or free vend. Coins are inserted in slot 50 and an LED display 51 shows that they have been received. There are also provided a bank of twenty buttons 52,53, two 20 buttons corresponding to each stack of cups 10. More particularly, in this embodiment, each pair of buttons 52, 53 relates to a given basic ingredient and selectively "with" or "without" sugar, or "hot" or "cold", or "cold" or "carbonated". When one of the buttons 52 or 53 is pressed, the machine is actuated to rotate the carriage 13 and strip the bottom cup 57 from the appropriate stack. Should that stack be empty, the machine will signal "sold out" by means of a photo-electric device 54 mounted in a fixed position beneath the bottom plate 12 of the carriage. The device 54 continually scans each stack of cups as the carriage rotates and is linked to the microprocessor 20. If a cup is present in the stack being scanned, the device 54 gives no signal, but if there are no cups in that particular stack, the "sold out" reading is given The microprocessor 20 controls the carriage motor 18 to pulse drive the motor initially to give a relatively slow start, followed by a fast drive period, and finally a further pulse drive to reduce the speed of rotation of the carriage towards the end of its movement to assist stopping the carriage at its home position. It will thus be appreciated that during each operating cycle, the carriage rotates continuously through one revolution, the bottom cup 57 being stripped from the selected stack as the carriage continues to rotate. The drop position for the cup 57 is radially aligned with the upper end of the trailing fixed ramp 48. The stripping action is both positive and sufficiently slow to avoid creating too much of a vacuum which could result in a spray of the basic ingredient rising out of the cup. Also, to assist the collection in the stripped cup 57 of any of the basic ingredient which may have settled on the outside of the penultimate cup 56, a fixed surface or shelf 55 is positioned beneath the drop position so that the stripped cup 57 is at first only partially separated from the penultimate cup 56. During continuing rotation of the platform, the stack from which the cup 57 has been stripped moves the stripped cup along the shelf 55 thereby assisting any basic ingredient which may have settled on the outside of the penultimate cup 56 to drop or to be shaken off into the stripped cup 57. At the end of the shelf 55, the cup 57 drops clear of the remainder of the stack and rests on the base 58 of a channel or passageway 59 leading towards the access point 60 for the user at which the cup filled with the beverage is removed from the machine. At both the upstream and downstream ends of the passageway 59 there are provided, in this embodiment, supply points for introducing a required beverage ingredient. More particularly, in this embodiment, at the upstream end of the passageway 59 there are means 61 for introducing sugar, and at the downstream end of the passageway there are provided means 62, 63, 64 for introducing hot water, cold water and carbonated fluid respectively from corresponding supply tanks (not shown) contained in the machine. If desired, the supply of carbonated fluid may contain a mixture of, e.g. lemon syrup and carbonated liquid. In this case, the stack of cups selected by the user would be a stack of empty cups.

To convey the stripped cup 57 along the passageway 59, after a time delay to allow sugar or another ingredient to be introduced into the cup by the supply means 61, if required, there is provided a motor driven fan 65. The cup 57 can thereby be blown by the fan easily and safely in an upright position along a tortuous path to the user access point 60. The tortuous path is desirable to resist manual removal of a cup from within the machine and also to resist the passage of, e.g. steam, from the supply means 62 along the passageway 59 to the vicinity of the stacks of cups on the carriage 13. A sliding door 66 is also provided at the user access point which is opened by the user to remove the filled cup.

In operation, the carriage is prefilled with stacks of cups 10 pre-loaded with the required basic beverage ingredients, and the bottom cup of each stack rests on the upper lever 39 of the respective stripping means. The user inserts the necessary coin or coins for the beverage required and presses the appropriate selector button 52 or 53 to start the operating cycle. The selector button which has been pressed corresponds to a particular stack of cups 10 containing the required basic ingredient. The carriage 13 is driven by the motor 10 to rotate continuously through one revolution, i.e. until the carriage returns to its home position which is signalled to the microprocessor 20 by the second photo-electric device 22. As the carriage 13 rotates, the first photo-electric device 21 scans the slots 26 until the leading edge of the slot associated with the selected stack of cups arrives at the photo-electric device. An input signal from the photo-electric device 21 to the microprocessor 20 actuates the operation of the solenoid 28 to move the armature 35 into the coil thereby moving the ramp 34 radially outwardly into the rotary path of the stud 49 of the stripping means 37 of the selected stack which is then in engagement with the leading fixed ramp 47. At the same time the stud 49 of the preceding stripping means is in engagement with the trailing fixed ramp 48. On further rotation of the carriage 13, the stud 49 of the selected stack moves down the ramp 34 and causes the lower levers 40 of the stripping means to lift the upper levers 39 and thereby allow the stack to drop onto the lower levers (FIG. 6). Subsequently, the stud 49 of the stripping means of the selected stack rotates into engagement with the trailing ramp 48 and as it rises up that ramp, the lower levers 40 pivot downwardly (FIGS. 7 and 8) to strip the bottom cup 57 off the stack. Meanwhile, the upper levers 39 are also returned to their normal positions by the springs 42 to hold the remaining cups of the stack (FIG. 7). At the end of the stripping operation, the separated cup 57 is supported by the shelf 55 and is moved by its stack along the shelf until it drops into the upstream end of the passageway 59.

After stripping the bottom cup 57 from the selected stack, the carriage 13 returns to its home position and stops. Simultaneously, there is a time delay during which a further ingredient, if required, is introduced into the cup 57 by the supply means 61. The cup 57 is then blown by the fan 65 along the passageway 59 to its downstream end where the required further ingredient is added to the cup from the appropriate supply means 62 or 63 or 64. Finally the user opens the door 66 at the access point 60 and removes the cup filled with the desired beverage.

The invention is not restricted to the specific details of the embodiment described above. For example, it will be appreciated that any means for separating the bottom cup from a stack may be employed instead of the stripping means 37.

Similarly, the photo-electric devices 21, 22 may be replaced by other sensing means, e.g. micro-switches or mechanical detents.

The leading fixed ramp 47 is not essential, but its provision is advantageous to lessen the angle of inclination of the movable ramp 34 which would otherwise be required.

At both the upstream and dowstream ends of the passageway 59, sensing means linked to the microprocessor 20 may be provided to indicate that the required ingredient has been introduced into the cup 57 before the operating cycle is allowed to proceed. If the sensing means gives a signal indicating a malfunction, the machine will shut down.

The continuous rotation of the carriage 13 during the stripping action or otherwise separating the bottom cup 57 from the selected stack has been found to reduce considerably the stresses on the moving parts of the carriage. There is also no requirement to stop the carriage at a precise drop position. Although, it is preferred that the carriage returns to its home position at the end of the operating cycle, this is not essential since, as described above, any over-run can be compensated for by the microprocessor 20 and the sensing photo-electric device 21 during the next operating cycle. Indeed it is not essential that the carriage stops at the end of the operating cycle. It could continue to rotate, the next operating cycle starting when the user makes another selection. Furthermore, it is only necessary to employ a low-voltage DC motor 18, e.g. 24 volts, to rotate the carriage 13.

Another advantage achieved by the above described vending machine is the slow separation of the cups to create minimum disturbance of the basic ingredient. It is also an advantage that the stripped cup 57 travels along the shelf 55 before being completely separated from its stack so that any basic ingredient on the outside of the penultimate cup 56 drops or is shaken off into the cup which will supply the required beverage to the user. This movement of travel of the stripped cup 57 further introduces an acceptable tolerance in the drop position before the cup reaches the upstream end of the passageway 59.

We claim:

1. An apparatus for dispensing the bottom cup from a selected stack of cups comprising:
    (a) a rotable carriage for supporting a plurality of stacks of cups, said stacks being arranged along the rotary path of said carriage;
    (b) drive means to rotate said carriage;
    (c) means for selecting the stack from which a cup is to be dispensed;
    (d) means for sensing when the selected stack reaches a predetermined position along the rotary path of said stacks;
    (e) separating means at the bottom of each stack for separating the bottom cup from the respective stack; and
    (f) a solenoid operated ramp for movement into the rotary parth of said separating means to actuate said separating means to separate the bottom cup from said selected stack, said solenoid being operated by a signal from said sensing means.

2. The apparatus of claim 1 wherein the separating means comprise levers for stripping the bottom cup from the stack.

3. The apparatus of claim 2 wherein a surface is present for supporting the separated bottom cup in a partially separated position beneath the penultimate cup of the stack while the carriage continues to rotate.

4. The apparatus of claim 3 wherein a passageway is present for conveying the separated bottom cup to an access point for recipient.

5. The apparatus of claim 4 wherein means are present at one or more points along said passageway for introducing at least one beverage ingredient into the cup.

6. The apparatus of claim 5 which utilizes a motor driven fan for blowing the separated bottom cup along said passageway.

7. A vending machine for beverages utilizing the apparatus of claim 1.

8. A vending machine for beverages utilizing the apparatus of claim 5.

9. A vending machine utilizing the apparatus of claim 6.

* * * * *